Dec. 11, 1951     G. R. WILLIAMS     2,577,835
ENGINE TIMING DEVICE
Filed Aug. 4, 1945     2 SHEETS—SHEET 1

Inventor
George Raymond Williams

By Ralph L. Chappell
Attorney

Dec. 11, 1951        G. R. WILLIAMS        2,577,835
ENGINE TIMING DEVICE
Filed Aug. 4, 1945                              2 SHEETS—SHEET 2
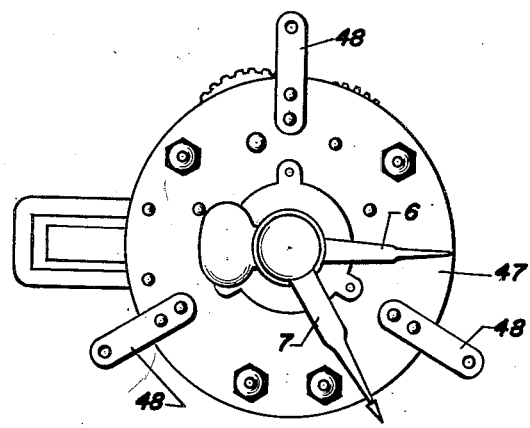
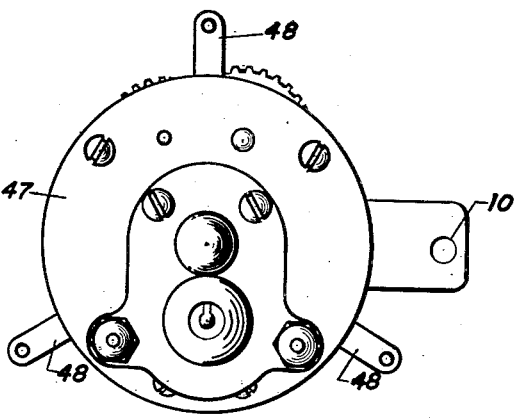
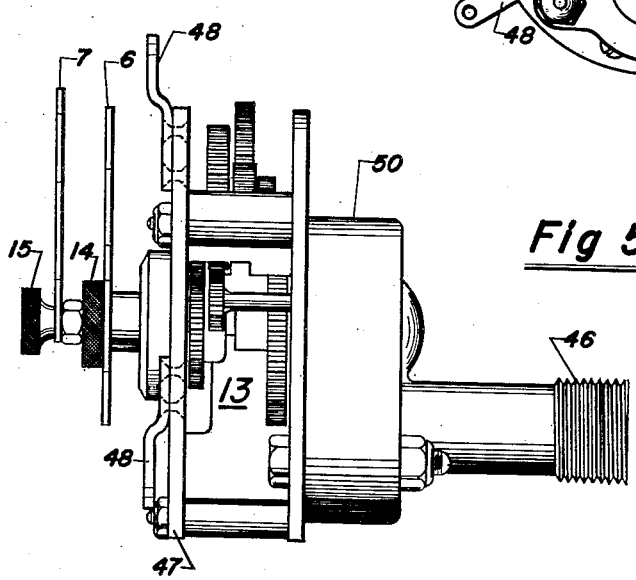
Inventor
George Raymond Williams
By Ralph L Chappell
Attorney Patented Dec. 11, 1951

2,577,835

UNITED STATES PATENT OFFICE 2,577,835

ENGINE TIMING DEVICE

George Raymond Williams, United States Navy

Application August 4, 1945, Serial No. 609,002

6 Claims. (Cl. 73—116)

(Granted under the act of March 3, 1883, as amended April 30, 1928; 370 O. G. 757)

This invention relates to timing devices for internal combustion or other engines where it is desired to test or adjust for exact timing of certain phases in a cycle of operation.

More particularly, this invention comprises a means for determining or setting the timing of valve adjustments, ignition or other phases in the cycle of operation of an internal combustion engine having reciprocating pistons and an opening at the side of the cylinders in the combustion chamber normally used for spark plugs, injection nozzles, etc.

An object of this invention is to provide a simple, dependable and accurate means for timing the operation of valves or ignition in an internal combustion engine.

Another object is to provide means insertable in a cylinder of an internal combustion engine for determining the upper dead center of the piston within said cylinder accurately within a sixteenth of a degree.

Another object is to provide electrical contact means for indicating the location of the top dead center of a piston in a reciprocating internal combustion engine, adaptable for use in most common forms of internal combustion engine construction.

Another object is to provide an instrument adaptable for use with most common forms of internal combustion engines for indicating accurately the timing of ignition and/or valves.

Other and more specific objects will become apparent in the following detailed description of the present invention, having reference to the accompanying drawings, wherein:

Figs. 3, 4 and 5 are three views of the internal mechanism incorporated in the casing with the indicator ends mounted thereon.

Figure 6:
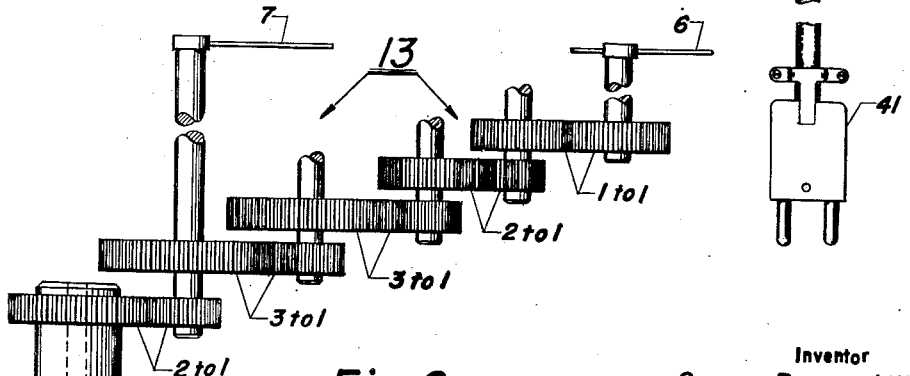
Fig. 6 is a schematic diagram of the gearing used in this mechanism.

In connection with the parts shown in the figures, a length of the standard flexible drive shaft is used for coupling the present device with a tachometer drive on the engine to be tested, complete with standard fittings at the ends thereof. The device shown in the drawings consists of a case 1 made of any suitable material having a handle 2 to facilitate carrying the device. The front of the case is fitted with a set of concentric dials 3, 4 and 5 over which a pair of indicator hands 6 and 7 are rotatably mounted, a pair of indicator lights 8 and 9, a push button 10 and a pair of toggle switches 11 and 12. Inside the case is mounted a mechanism shown in three different views in Figs. 3 to 5, which operates the hands 6 and 7. The hands are geared by means of the gearing 13, which is schematically illustrated in Fig. 6, to provide a ratio of 1 to 18 between the slow hand 7 and the fast hand 6 and a ratio of 2 to 1 between the drive shaft and the slow hand 7. This ratio may be obtained in accordance with the illustrated schematic diagram, indicated in Fig. 6, or any other suitable manner. The drive shaft has a standard tachometer drive connection to which a length of ordinary flexible drive shaft may be connected for coupling with the tachometer drive connection on an internal combustion engine which is normally driven at half crankshaft speed. Thus, the hand 7 will be driven at crankshaft speed and the hand 6 will be driven 18 times as fast. As a result, the hand 6 will indicate 20 degrees per revolution or 10 degrees every half revolution, and the scales 3 and 4 are graduated in accordance with this relation and marked from 0° to 10° from the top and bottom in a clockwise direction on one scale 4, and from the top and bottom in a counter-clockwise direction on the other scale 3 to indicate the number of degrees of crankshaft travel; and the scale 5 is graduated in accordance with the gear relation to indicate units of 10 degrees each from 1 to 9 in each direction from the top and bottom of the scale. The top of the dials is indicated by the letters TDC indicating the top dead center position, and the bottom of the dials is indicated by the letters BDC representing the bottom dead center. These indications apply to the slow hand 7 only, whereas the fast hand 6 will give the number of degrees interpolated between the units of ten on the scale 5 indicated by the slow hand 7.

Figure 1:
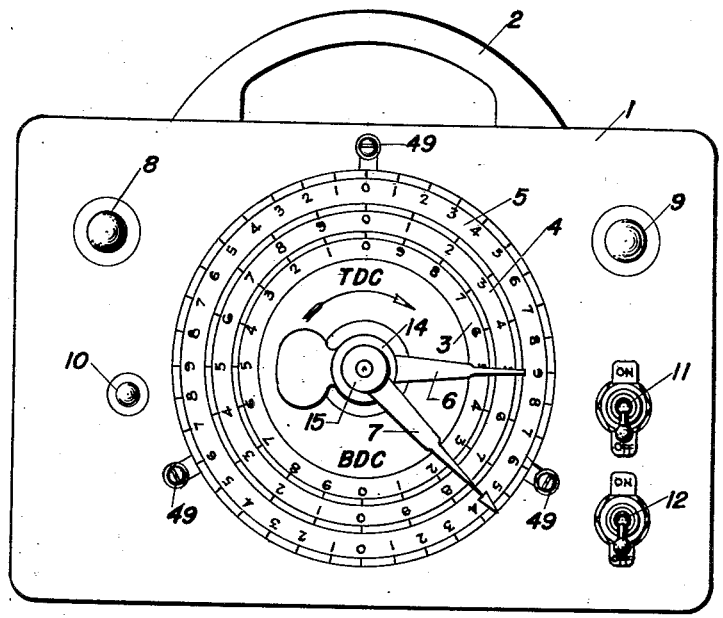
Fig. 1 is an external view of the case or main control box of one form of the present invention.
Figure 2:
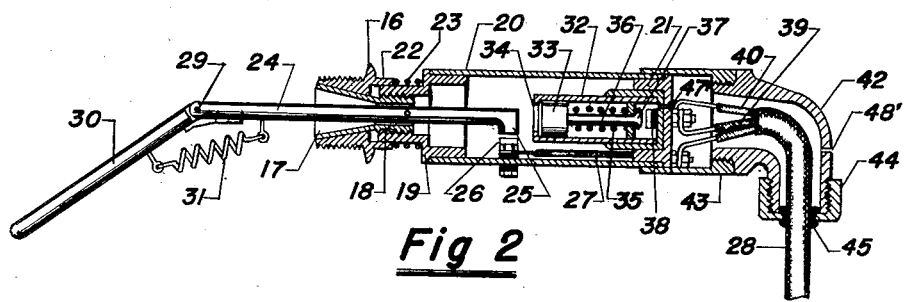
Fig. 2 is a sectional view of the top center indicator with a connection to the cable which extends to a plug in the case.

The push button 10 is for the purpose of releasing or declutching a conventional clutch mechanism (not shown) in the drive connection between the hands 6 and 7 and their respective shafts, for the purpose of permitting the resetting of the hands to any position while the push button 10 is held down. The hands 6 and 7 may be reset by manually manipulated knurled knobs 14 and 15, respectively, while the button is held depressed. Fig. 2 shows the top center indicator which is insertable in a spark plug or other opening in the cylinder head, and comprises the spark plug shell portion 16, the inside of which is formed into a conical shape which fits over a conical nozzle 17, the conical surfaces of which are lapped together to form a gas-tight seal. The nozzle 17 is threaded at 18 to the end 19 of the cylinder casing 20, the other end of which is closed by a plug 21. The outer end 22 of the spark plug shell is slidably fitted over the end 19 of the casing, and a spring 23 is fitted between the end of the spark plug shell and a shoulder on the end of the casing 20 to urge the conical nozzle surface against the conical surface of the shell for maintaining a gas-tight seal therebetween, but permitting separation therebetween by pushing on the casing toward the spark plug shell when it is desired to turn the parts relatively to each other. An arm 24 extends through the nozzle and is pivoted therein. This arm has a contact point at its end 25 inside the casing 20 adaptable for closing on an insulated contact point 26 mounted in the wall of the casing 20 and connected by wiring 27 to the three wire cable 28. The other end of this arm 24 is pivotally connected at 29 to another arm 30 having a rounded, smooth end for contact with the head of the piston in the engine cylinder. The two arms 24 and 30 are resiliently held at an angle of about 35° by spring 31. A cylinder 32, open to the inside of the casing 20 is mounted in the plug 21 and has a piston 33 resiliently urged against a shoulder 34 at the open end of the cylinder, by a spring 35. The rod 36 on said piston has a contact point 37 at its end for making contact with an insulated point 38 mounted in the wall of the plug 21. This insulated point is electrically connected by a wire 39 in the three wire cable 28. A third wire 40 furnishes the common ground for the circuits through the two pairs of contact points described above, and it is also passed through this three wire cable 28. This cable ends with a common male cannon plug 41. The outer end of the casing is connected to an elbow 42 by means of sleeve 43, said elbow having a cap 44 for the purpose of sealing the wire connections and to indicate the direction in which the arm 30 extends from the inner end of the instrument when it is inserted in a cylinder wall and is otherwise invisible. A rubber grommet 45 is inserted in the end of the cap 44 to protect the cable 28. The plug 41 fits in a corresponding similar plug mounted on the back of the case 1 (not shown). The power for the electric circuits of the contact points, each pair of which is connected to one of the indicator lights 8 and 9, through the switches 11 and 12, respectively, is supplied by batteries mounted in the case 1. One of the lights 8 indicates when the contacts 25, 26 are closed, provided the respective switch 12 is turned on; the other light 9 indicates when the contact points 37, 38 are closed, provided the respective switch 11 is turned on.

The frame 47 of the gear mechanism is mounted on the inside of the case 1 by means of three supporting arms 48 fastened to the wall of the case by screws 49. The drive shaft outlet 46 is mounted on an adaptor cover 50 containing the gears for providing crankshaft speed to the slow hand 7.

The operation of the device is as follows. A spark plug is removed from one of the cylinders of an internal combustion engine to be tested or adjusted. The spark plug shell 16 is inserted in its place and the casing 20 is pushed in against the pressure of the spring 23 and turned so that the elbow points in the direction of the piston head. This will position the arm 30 in a direction wherein its end extends towards the head of the piston. The plug 41 is connected to its proper socket in the back of the case 1, and a flexible shaft coupled to the tachometer drive of the internal combustion engine is connected to the drive shaft outlet 46, extending from the mechanism shown in Figs. 3 to 5 through the back of the case 1. The engine is now turned over by hand in its normal direction of operation, making sure that the ignition is off and the throttle wide open. When the piston reaches its compression stroke, the pressure built up in the cylinder will be transmitted through the nozzle 17 into the casing 20 and into the open end of the cylinder 32, acting on the piston 33 against the pressure of the spring, thus bringing the contacts 37 and 38 together. This movement of the piston 33 is permitted by reason of the vent 47' in the plug 21, and the vent 48' in the elbow 42 releasing the pressure on the inner side of the piston 33 to the atmosphere. These contacts being closed, and the toggle switch 11 being on, the light 9 lights up to indicate that the piston is on its pressure or compression stroke.

The exact reading of the indicator hands 6 and 7 is noted when the other light first goes on, denoting when contacts 25, 26 come together. The engine is turned further until the light just goes off and the exact reading again noted on the dials. The difference in the readings is then divided by two. The engine is then turned back about 20° more than half way between the above readings, and then turned forward again slowly to the exact indication halfway between the two readings first obtained. The push button 10 is then depressed and the hands set at the 0° marks indicating the top dead center position of the piston. The push button 10 is then released and the instrument is now set for indicating the exact position of the engine crankshaft with respect to the piston in the cylinder to which the instrument is connected. For the purpose of setting any valve or the ignition to the desired timing, all that is necessary to do is to turn the engine in a forward direction to the point where the hands 6 and 7 indicate the exact timing desired and the corresponding adjustment is then made on the valve or on the ignition mechanism. The purpose of turning the engine in the forward direction each time to come up to the exact reading, is to always take up the slack in the gear train and drive connections in the same way to avoid any errors due to play in the mechanism.

The timing for any other elements of the engine is made in the same manner, once the proper relation is established between the crankshaft and the dials on the instrument. Thus, it may be seen that a simple means is provided for quickly and accurately timing any features of an engine that may be desired for the purpose of either checking the timing or setting any particular adjustments to get the proper timing of any engine element with respect to the cycle of operation thereof. The present device is rugged in construction and simple to operate, as well as easy to understand, and is, therefore, a useful instrument in engine maintenance, repair and construction.

Although only one specific form of the device is shown and described herein, it will be obvious that many modifications in the structure of the various elements may be made without departing from the spirit and scope of this invention, as defined in the appended claims.

The invention described herein may be manufactured and used by or for the Government of the United States of America for governmental purposes without the payment of any royalties thereon or therefor.

What I claim is:

1. In combination, a case having a rotatable indicator adaptable for drive connection to an engine and geared to turn at crankshaft speed, a degree scale therefor having a zero marking, a vernier rotatable indicator on said case geared to turn at a multiple of the crankshaft speed, a corresponding crankshaft degree scale therefor to accurately interpolate the readings between the marks on the first named degree scale, indicator means on said case, a top center feeler device for insertion in a cylinder of the engine having a first pair of contact points closed by super atmospheric pressure in the cylinder and a second pair of contact points closed by the piston in said cylinder while in and near its top dead center, and connections between said pairs of contact points and said indicator means for indicating the compression stroke and the top dead center position of said piston, and means for setting the rotatable indicators to said zero marking without affecting the top dead center position of said piston obtained from said indications, whereby said scales provide an index of the true crankshaft position relative to said cylinder.

2. As a unitary article of manufacture, a top center compression stroke feeler device comprising a casing insertable into a spark plug opening in an engine cylinder, and having a chamber, a neck portion connecting said chamber to the inside of the cylinder, a lever pivotally mounted in said neck portion with a contact point at its end in said chamber, an opposing contact mounted in the wall of the casing but insulated therefrom, a rod pivotally mounted at the end of said lever in the cylinder, normally resiliently held at an angle thereto, for angular displacement by the top of the corresponding piston after the contacts are closed, and means including a second pair of relatively movable contacts mounted in said casing and responsive to the fluid pressure in said chamber, said contacts being operable to closure in response to super atmospheric pressure in said chamber when the piston is on the compression stroke.

3. A device as defined in claim 2 wherein said means has the movable one of the second pair of contacts integral with a plunger resiliently held inwardly in a cylinder open to said chamber.

4. In combination, a case having a rotatable indicator adapted for drive connection to an engine and geared to turn at crankshaft speed, a degree scale therefor having a reference marking thereon, indicator means on said case, a top center feeler insertable in a cylinder of the engine and having a first pair of contact points closed by super atmospheric pressure in the cylinder and a second pair of contact points closed by the piston in the cylinder while in and near its top dead center, connections between said pairs of contact points and said indicator means for indicating the compression stroke and the top dead center position of the piston, and means for setting the rotatable indicator to the reference marking on said scale without affecting the top dead center position of the piston obtained from the indications, whereby said scale provides an index of the true crankshaft position relative to the cylinder.

5. In combination, a case having a rotatable indicator adapted for drive connection to an engine and geared to turn at crankshaft speed, a degree scale therefor having a reference marking thereon, a top center feeler insertable in a cylinder of the engine and having a pair of contacts closed by the piston in the cylinder while in and near its top dead center, indicator means actuated by closure of said pair of contacts to indicate the top dead center position of the piston, and means for setting the rotatable indicator to the reference marking without affecting the top dead center position of the piston obtained from the indications, whereby said scale provides an index of the true crankshaft position relative to the cylinder.

6. In combination, first indicator means adapted for drive connection to an engine for indicating the relative angular position of the crankshaft thereof, said means having a zero reference point, a feeler insertable in a cylinder of the engine and having a pair of contacts closed by the piston in the cylinder while substantially in its top dead center position, second indicator means actuated by closure of said pair of contacts to indicate the top dead center position of the piston, and means for setting the first indicator means at said reference point without affecting the top dead center position of the piston obtained from the indications, whereby said scale provides an index of the true crankshaft position relative to the cylinder.

GEORGE RAYMOND WILLIAMS.

REFERENCES CITED

The following references are of record in the file of this patent:

UNITED STATES PATENTS

| Number | Name | Date |
| --- | --- | --- |
| 668,601 | Emery | Feb. 19, 1901 |
| 1,683,710 | Zitzman | Sept. 11, 1928 |
| 1,789,593 | Murphy | Jan. 20, 1931 |
| 2,024,314 | Urfer | Dec. 17, 1935 |
| 2,072,984 | Haskins | Mar. 9, 1937 |
| 2,096,803 | Hantjopoulos | Oct. 26, 1937 |
| 2,110,196 | Brohman | Mar. 8, 1938 |
| 2,149,620 | Museus | Mar. 7, 1939 |
| 2,361,462 | Dickinson | Oct. 31, 1944 |